United States Patent [19]

Barajas

[11] Patent Number: 4,531,986

[45] Date of Patent: Jul. 30, 1985

[54] SOLDER COMPOSITION

[75] Inventor: Felix Barajas, Huntington Beach, Calif.

[73] Assignee: McDonnell Douglas Corporation, Long Beach, Calif.

[21] Appl. No.: 662,394

[22] Filed: Oct. 15, 1984

[51] Int. Cl.³ .............................................. B23K 35/34
[52] U.S. Cl. ........................................ 148/24; 148/26
[58] Field of Search ...................... 148/24, 26; 75/53

[56] References Cited

U.S. PATENT DOCUMENTS

| | | | |
|---|---|---|---|
| 2,914,435 | 11/1959 | Wasserman | 148/24 |
| 2,978,370 | 4/1961 | Mulholland | 148/24 |
| 4,373,974 | 2/1983 | Barajas | 148/24 |

Primary Examiner—Peter D. Rosenberg
Attorney, Agent, or Firm—Max Geldin

[57] ABSTRACT

Novel solder composition or solder cream, particularly adapted for high speed soldering of components in electronic circuits, whereby movement of components is avoided and essentially no solder balls are formed, comprising between 10 and 14% of a vehicle and between 86 and 90% of solder metal dispersed in the vehicle, preferably employing solder metal of particle size ranging from about 40 to about 70 microns, and utilizing as solvent in the vehicle a low volatile high molecular weight alcohol, preferably a primary aliphatic monoalcohol containing about 8 to about 18 carbon atoms, e.g., cetyl alcohol, in an amount of about 10 to about 50% by weight of the vehicle.

26 Claims, 5 Drawing Figures

SOLDER COMPOSITION

BACKGROUND OF THE INVENTION

This invention relates to novel solder compositions or solder creams, and is particularly concerned with the provision of solder compositions especially adapted for soldering components during high speed fusing operations.

A solder cream is a material that is capable of being applied to a substrate or surface in a specific pattern using screening or analogous methods which can subsequently undergo fusing to provide an electrical joint or interface commonly described as a solder joint. The solder cream generally consists of metallic balls of various alloys such as tin-lead, tin-lead-silver, tin-lead-gold, etc., contained in a vehicle including a flux such as wood rosin, or derivatives thereof. In addition, a suspension medium is present in the vehicle and is combined with the flux to provide a paste substance of uniform texture, consistency, and improved surface wetting. In addition, an organic solvent is present in the vehicle to provide the proper consistency for the vehicle.

In electronic circuitry, solder creams or compositions are employed to secure miniature electronic components to a circuit on a substrate such as ceramic or glass, or the like. Circuits similar to those used on printed circuit boards are produced on the substrates. In certain instances, the circuit is located on one side of the substrate, with pads being provided in certain areas, other parts of the circuit being covered with an insulating material.

The solder cream having a paste-like consistency is applied, for example by means of a silk screen, to the pads on the circuit board. Thereafter, the electronic components are carefully positioned with their peripheral contacts on the solder cream-coated pads. When all of the components are thus in place, the board, with such components temporarily positioned and retained thereon by the solder cream, can be placed in a vapor reflow system and subjected to a sufficiently high temperature to cause the metal content of the solder cream to liquefy and the contacts of the electronic components to be fused and to adhere to the pads on the circuit board.

Many solder creams or compositions have been developed and are commercially available. However, such prior art and commercially available solder creams have the disadvantage that during soldering many small solder balls are formed around and between each of the solder pads. Many of these solder balls create electrical short circuits between adjacent pads. Further, many solder balls form beneath the components, and it is difficult, and sometimes impossible, to scrub or remove solder balls from the areas of the circuit board immediately beneath the components. Thus, due to this problem, short circuiting exists and the rejection rate for such boards has been very high.

My U.S. Pat. No. 4,373,974 discloses a novel solder composition for soldering components in electronic circuitry, whereby the formation of solder balls is essentially eliminated, thus avoiding the necessity of removing such solder balls. Such composition comprises solder metals such as tin and lead, dispersed in a vehicle containing viscosity-controlling agents, organic solvents including lower aliphatic alcohols such as butyl alcohol, and ethylene glycol, and a flux, employing a narrow range of between 13 and 14% vehicle, and between 86 and 87% of solder metal, by weight of the solder composition.

Although the composition of my above patent has proved highly satisfactory for soldering components generally in electronic circuitry during normal soldering operations, in high speed soldering or fusing operations employing such composition it has been found that movement of components occurs, causing solder ball formation.

It is accordingly an object of the present invention to provide an improved solder composition or solder cream which is especially adapted for soldering components during high speed fusing operations.

Another object is the provision of a solder composition of the above type which minimizes formation of undesirable solder balls during high speed fusing operations, and causing short circuits between electronic components.

A still further object of the invention is to provide an efficient solder composition of the general type disclosed in my above patent, and which is particularly adapted for soldering electronic components utilizing high speed soldering operations.

SUMMARY OF THE INVENTION

It has now been found that the above objects and advantages can be achieved according to the invention by the provision of a solder composition of the general type disclosed in my above patent, but employing a vehicle for the solder metals, such vehicle containing as solvent a low volatile high molecular weight alcohol, as described in greater detail below.

It has been found that the use of such low volatile alcohol, particularly in the form of a high molecular weight primary aliphatic monoalcohol, as the solvent in the solder cream vehicle, prevents rapid evaporation of volatiles in the solder cream or solder composition during high speed solder fusing operations, resulting in efficient soldering without movement of electronic components during such soldering operations and in the absence of solder ball formation.

Thus, the solder composition of the invention comprises by weight (a) 10–14% of a vehicle containing as solvent a low volatile high molecular weight alcohol, particularly a primary aliphatic monoalcohol of from about 8 to about 18 carbon atoms, and (b) 86 to 90% of a solder metal dispersed in said vehicle. The vehicle also generally contains a viscosity-controlling agent and a flux.

More specifically, and preferably, the invention provides a solder composition especially adapted for soldering components in high-speed solder fusing operations and whereby movement of the components is avoided and essentially no solder balls are formed, comprising finely-divided solder metal dispersed in a vehicle containing (a) a thixotropic agent, (b) an organic solvent comprised of a primary aliphatic monoalcohol containing about 8 to about 18 carbon atoms, in an amount of about 10 to about 50% by weight of the vehicle, and (c) a flux, said vehicle being present in an amount of 10 to 14%, and said solder metal being present in an amount of 86 to 90%, by weight of said composition, the particle size of said metal ranging from about 40 to about 70 microns.

These and other objects and features of the invention will become apparent from the following detailed description thereof.

DETAILED DESCRIPTION OF THE INVENTION COMPOSITION AND PREFERRED EMBODIMENTS

The invention will be more clearly understood by reference to the description below, taken in connection with the accompanying drawings wherein.

Figure 1:
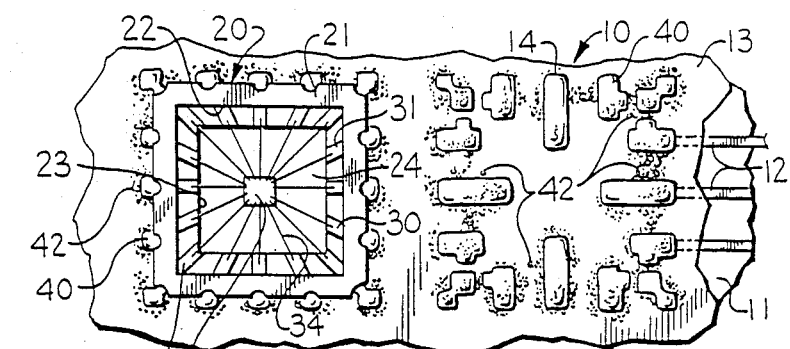
FIG. 1 is an enlarged, fragmentary, plan view of a portion of a circuit board, with a component mounted thereon, to illustrate the problem solved by the present invention when utilizing conventional solder creams in high speed fusing operations.
Figure 2:
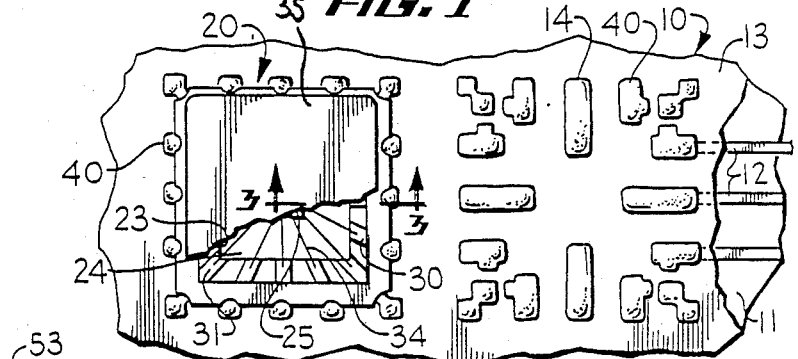
FIG. 2 is a view similar to FIG. 1 showing the nature of the circuit board and component after use of the solder cream of the present invention in high speed fusing operations.
Figure 3:
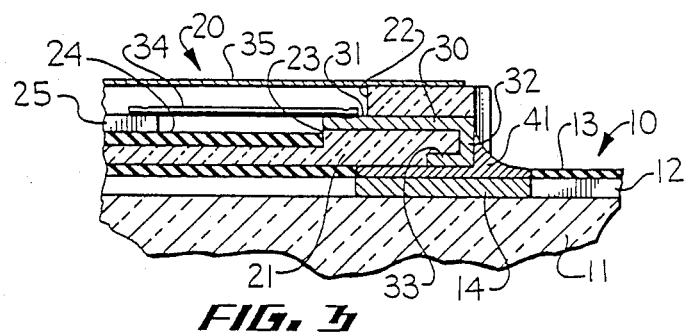
FIG. 3 is a further enlarged, fragmentary, sectional view through the component and the circuit board, and taken substantially along the line 3—3, FIG. 2.

With reference to the drawings, and particularly to FIGS. 1, 2 and 3, there is illustrated a circuit board 10 which comprises a substrate 11 which may be of any non-electrically conductive material such as ceramic, plastic or the like. In the manner familiar to this art, a circuit 12 is printed or otherwise deposited upon the substrate 11. Thereafter, a coating 13, which may be lacquer or the like, is deposited on the major portion of the circuit 12, leaving exposed areas or pads 14. The circuit 12 may be formed from any suitable metallic material such as gold, platinum, copper, or the like, which has an affinity for solder.

Chip carriers, indicated generally at 20, (or other electrical components) are intended for electrical attachment to the exposed pads 14 on the circuit board through use of the solder cream of this invention. The chip carriers 20 are generally made from a nonconducting material, such as ceramic, and, in the present instance, are illustrated as being generally square. Each chip carrier includes a body 21 which has stepped openings 22 and 23 therein. An insulating material 24 is deposited within the opening 23 and retained therein by any suitable cement.

The chip carriers are also provided with contacts 30 of a conducting material such as gold or the like. The contacts 30 are embedded in the carrier body 21 and have portions extending into the recess 22 as at 31. The contacts 30 extend to the outer edge of the body 21, over that edge as at 32, and inwardly as at 33 to expose contact portions that are configured generally to correspond with the pattern of the pads 14 on the circuit board 10. The inner ends 31 of the contacts 30 are connected to the chip 25 by means of small wires 34. Each of the ends of the wires 34 have their connections secured as by welding. A cover 35 is generally secured to the body 21 to protect the wires 34 and the chip 25. Since the chip carriers 20 are physically 15 to 20 millimeters square, and the chip 25 may be in the order of 1 to 2 millimeters square, the wires 34 must be secured utilizing special welding machinery under microscopic viewing.

The solder cream of the present invention is used by first applying it to each of the pads 14. This may be accomplished by means of a syringe-type dispenser or preferably by screening the solder cream onto the pads 14.

Following application of the solder cream to the pads 14, the chip carriers 20 are carefully positioned whereby the portions 33 of the contacts 30 are immersed in the solder cream shown at 40 in FIG. 1. The chip carriers are thus temporarily retained in position by means of the solder cream, its viscosity being such as to form a soft attachment.

Figure 5:
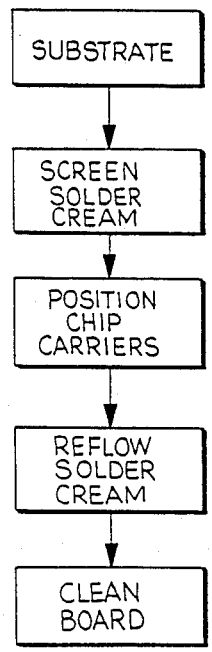
FIG. 5 is a diagrammatical view illustrating the major steps in one process for using the solder cream of this invention.

Thereafter, the circuit board containing the temporarily positioned chip carriers is placed in a vapor reflow system and heated, by means of the vapor therein, to a temperature sufficient to flow the metal component of the solder cream. During this reflow operation, the high molecular weight alcohol solvent in the solder vehicle, which can be cetyl alcohol, a solid at normal temperatures, also melts, but does not evaporate, and intermixes as a liquid with the other liquid components of the vehicle. Upon removal of the circuit board from the vapor reflow system, the board is subjected to a vapor bath of a suitable solvent which cleans the board and removes residual vehicle therefrom. These steps in the process are illustrated in FIG. 5 and the final solder connection is as illustrated at 41 in FIG. 3 which, through the wires 34 and contacts 30, electrically connect selected areas of the chip 25 to each individual pad 14.

As illustrated in FIG. 1, solder cream heretofore available and used in high speed solder fusing operations resulted in movement of electronic components and created a number of solder balls 42 which were difficult to remove from the circuit boards and which produced electrical shorts between the pads 14, and therefore between the selected areas of the chip 25. By means of brush cleaning, the majority of these solder balls could be removed from areas about the periphery of each chip carrier. However, solder balls which existed between the chip carriers and the circuit boards were virtually impossible to remove, thus resulting in a very high rejection rate of the completed circuit boards. Through use of the solder cream of the present invention, movement of electronic components did not occur and virtually no solder balls were created in high speed fusing operations, with the boards appearing as best illustrated in FIG. 2. This has substantially reduced the rejection rate for completed boards in these types of operation.

Thus, the solder composition or solder cream of the invention containing a vehicle including the high boiling alcohol solvent of the invention in conjunction with solder metal, in the proportions noted above, permits the formation of strong efficient solder connections as at 41 between the pad 14 and the electrical contacts 30 to the chip 25, without movement of components 14 and 33 during high speed soldering operations. Further, through use of the solder cream of this invention, particularly since movement of components is prevented, virtually no solder balls are created between or beneath the pads 14, thus avoiding production of electrical shorts between the pads.

The vehicle for the solder metals of the solder composition of the invention is generally a substantially liquid composition having desirable viscosity characteristics and which maintains the solder metals in suspension without settling of the fine solder metal particles. Such vehicle can include viscosity controlling agents, certain organic solvents as defined below, rosin, or derivatives thereof, as flux, and other components such as organic amines.

Thus, one component of the vehicle is a compound which increases the viscosity of the vehicle to the desired consistency, such as a thixotropic agent, and which can also function as a suspension medium to prevent settling of the solder particles. The amount of thixotropic agent is within the range 0.5-20% by weight of the vehicle. Any thixotropic agent can be used, provided that it does not leave a residue insoluable in organic solvents on the solder metal, after the fusing operation. Common thixotropic agents are disclosed by Eirich, "Rheology," Academic Press, New York, 1967, Vol. 4, page 457. A preferred thixotropic agent is hydrogenated castor oil (Baker Castor Oil Co.) "Thixatrol". Carboxy methyl cellulose also can be used.

An essential feature of the present invention is the incorporation of a solvent in the form of a low volatile alcohol in the vehicle. Such solvent functions to provide the proper consistency for the vehicle, while at the same time having the important advantage of substantially reducing solvent evaporation during high speed soldering operations. This meaintains the proper consistency of the solder cream during such operations, resulting in efficient soldering without movement of electronic components, and avoiding solder ball formation. The preferred alcohols for this purpose are high molecular weight primary aliphatic monoalcohols containing from about 8 to about 18 carbon atoms, particularly about 12 to about 18 carbon atoms. These are high boiling alcohols, including saturated and unsaturated alcohols, preferably the former, in either liquid or solid form. Examples of such alcohols are the saturated octyl, decyl, lauryl, myristyl and stearyl alcohols. Examples of unsaturated alcohols are olyl, linoleyl and linolenyl alcohols. The preferred alcohol for purposes of the invention is cetyl alcohol. Such alcohol solvent is employed in an amount in the range of about 10 to about 50%, preferably about 10 to about 30%, by weight of the vehicle.

Another component of the vehicle is a flux. Various types of fluxes can be employed. Thus, one suitable flux is a rosin type flux, that is rosin or derivatives thereof. Rosin, the non-steam volatile fraction of pine oleoresin, is a mixture of five isomeric diterpene acids, the most abundant component being abietic acid. The terminology "rosin and derivatives thereof" includes rosin derived from gum, wood or tall oil, the acids in rosin such as abietic acid, and any of their derivatives, such as "Staybelite," "Poly-Pale," "Dimerex," "Vinsol," etc. The amount of flux present in the vehicle can range from 20-65%, by weight of the vehicle.

Other organic materials can be employed as flux, such as petrolatum, rosin mixed with waxy or fatty material, long chain organic acids such as adipic acid, tars, and particularly paraffin waxes.

Also, the flux can be a water-soluble material such as an aqueous solution of sorbitol.

The flux also can comprise inorganic materials such as, for example, borax, alkali metal fluoborates, and the like.

Other components such as amine hydrochlorides, e.g., propylamine hydrochloride, hydroxyl substituted aliphatic amines, and aliphatic amines such as isopropyl amine, can be present, e.g., to remove surface oxides of the solder metals. These materials can be present in amounts ranging from 0.01 to 10% by weight of the vehicle.

Where all of the components of the vehicle are in liquid form, the resulting vehicle is entirely liquid. However, where the solvent component employed therein is a high molecular weight alcohol in solid form, e.g., cetyl alcohol, the resulting liquid vehicle is in the form of a dispersion containing particles of the solid alcohol in suspension. When the solder composition containing such vehicle is heated to operative soldering temperature, as previously noted, the solid alcohol liquefies so that the vehicle at this stage is in completely liquid form.

The solder compositions of the invention contain finely divided solder metals in the form of metallic balls or particles, dispersed in the vehicle. The solder metals can be any of the conventional single or multiphase metals normally used for soldering, particularly tin, lead and silver, and alloys and mixtures thereof. Alloys or mixtures of tin-lead, tin-lead-silver, tin-silver and lead-silver, for example, can be employed. A preferred mixture of solder metals employed in the solder composition of the invention consists essentially of a mixture of lead, tin and silver, which can contain from 61.5 to 62.5% tin, 1.75 to 2.25% silver, and the balance lead. A particularly preferred solder metal mixture consists of 36% lead, 62% tin and 2% silver.

The solder metal particles should be finely divided, preferably having a particle size ranging from about 40 to about 70 microns, particularly ranging from about 40 to about 60 microns in diameter. The metal particles are preferably round rather than oval or irregular, since oval or irregular particles clog the screens, whereas round particles pass freely through the screen. Thus, with round particles proper flow of the metallic particles through the screen takes place.

The solder compositions of the invention are prepared by admixing the solder metals and the vehicle including the alcohol solvent in certain proportions, as noted below. The use of a narrow range of 10 to 14%, and optimally 13.5%, of vehicle containing low volatile high molecular weight alcohol, and 86 to 90%, optimally 86.5% of solder metals, in the form of small metal particles of about 40 to about 70 microns size, e.g., of lead, silver and tin, by weight, is effective in soldering components of electronic circuits during high speed soldering operations, avoiding movement of electronic components and practically entirely eliminating the presence of solder balls following soldering.

The solder compositions of the invention can be employed for efficiently soldering components such as capacitors, resistors, integrated circuits and their packages or carriers, transistors, diodes, etc., onto a circuit, carried on a substrate, in high speed solder fusing operations.

The solder composition of the invention can be applied to any suitable substrate such as metal pads on a circuit board to which contacts of electronic components are to be soldered. Such application of the solder composition or solder cream can be made by use of metal screening to apply the solder cream to the pads. However, other modes of applying the solder cream in addition to screen printing, can be employed, including, for example, dipping the objects to be soldered into the solder composition, or employing syringe techniques.

Thereafter, the solder is heated to a temperature at which the solder metal and vehicle including high molecular weight alcohol become molten and a highly adherent fused solder bond is formed. For this purpose, vapor phase soldering is a preferred method, although other methods of heating the solder such as the use of belt furnaces, and infra-red heating can be employed. Any atmosphere for heating can be used, e.g., air, or an inert atmosphere employing an inert gas such as nitrogen.

The soldering operations as described above employing the solder compositions of the invention are particularly adapted to be carried out at high speed using suitable means and equipment, as described above, and avoiding displacement of electronic components during the soldering operations and preventing solder ball formation according to the invention.

The following table shows examples of soldering compositions according to the invention, the amounts noted being in terms of weight percent; it being understood that the compositions shown are only exemplary and not limitative of the invention.

TABLE

| COMPOSITIONS | A | B | C | D | E | F |
|---|---|---|---|---|---|---|
| Vehicle (weight percent) | 13.5 | 13.0 | 14.0 | 13.2 | 12 | 11 |
| Abietic acid | 69 | — | 65 | 55 | — | 40 |
| Paraffin wax | — | 69 | — | — | 45 | — |
| Cetyl alcohol | 15 | 15 | 25 | 35 | 45 | 50 |
| Hydrogenated castor oil | 14 | 14 | 8 | 7 | 7 | 6 |
| Isopropyl amine | 2 | 2 | 2 | 3 | 3 | 4 |
| Metal (40–70 micron particle size) | 86.5 | 87 | 86 | 86.8 | 88 | 89 |
| (weight percent) | | | | | | |
| Lead | 36 | 36 | 36 | 40 | 37 | 4 |
| Tin | 62 | 62 | 62 | 60 | 63 | 96 |
| Silver | 2 | 2 | 2 | — | — | — |

Figure 4:
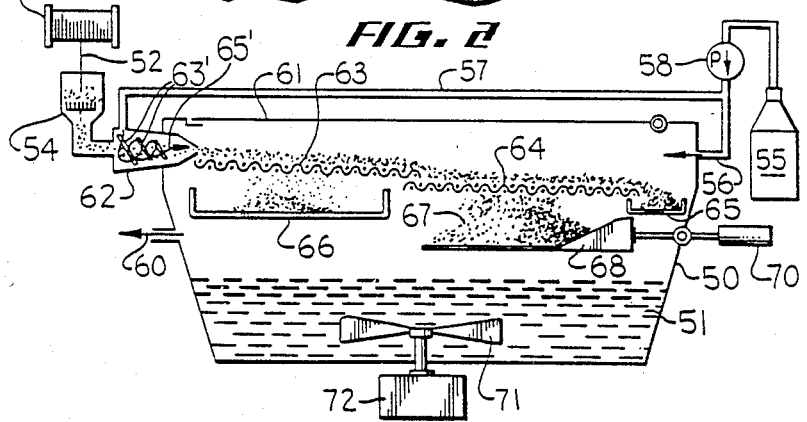
FIG. 4 is a schematic and diagrammatic view illustrating one method of manufacture of the solder cream of this invention.

FIG. 4 illustrates one means for making the solder cream of the invention. With reference to FIG. 4, the present solder cream may be manufactured using an apparatus similar to that illustrated therein. A so-called dry box 50 may be employed in which is deposited a quantity of the vehicle containing low volatile alcohol and flux at 51. The metallic component of the solder cream may be in the form of a wire 52 dispensed from a supply 53 into a cutter, shaver or grinder, illustrated at 54, to reduce the metal to small particles of between 0.2 and 35 micron size. The box 50 is maintained with an inert atmosphere of nitrogen or the like, supplied from a source 55 through conduits 56 and 57 and a pump 58. The conduit 56 communicates with the interior of the box 50, there being a small bleed orifice 60 in order to maintain the atmosphere. The box may also be provided with a cover 61 for access thereto.

The conduit 57 extends to a nozzle 62 which receives the small metallic particles from the cutter 54. These particles travel through the interior of the nozzle 62 and, by contact therewith, are reduced to substantially round, minute particles. As noted in FIG. 4 of the drawings, nozzle 62 has internal ribs 63' which cause the particles to spiral therein in an ever-reducing spiral path, as illustrated by the arrow 65', thus creating the round nature of the particles. The metal particles, being round, can be used more efficiently in the silk screening operation, when applying the solder cream to a substrate, since particles of any other shape tend to clog the silk screen and produce an uneven distribution of the solder cream on the substrate. The metallic particles leave the nozzle 62 and are blown onto a suitable fine-mesh screen 63 of a size smaller than the size of the desired particles. Thereafter the metallic particles travel onto a screen 64, having a mesh to permit travel therethrough of the metallic particles of the desired size. Particles larger than the desired size may be collected by a tray 65 with the fine particles being collected by a tray 66. The desired size particles, as at 67, are dispensed from the screen 64 onto a tray 68, the weight thereof, as determined by a counterbalance 70, serving to deliver the particles into the vehicle containing the alcohol solvent of the invention. Thereafter, the particles 67 are mixed with the vehicle 51 by means of a mixer 71 driven by a suitable power source 72.

While FIG. 4 illustrates one method of combining the desired size metallic particles with the vehicle to produce the solder cream, in practice, other similar methods may be used and several additional screening steps may be employed to insure the desired size of the metallic material. This operation is carried out within an inert atmosphere, e.g., nitrogen, or the like, substantially to eliminate oxidation of the metallic particles and to produce a solder cream substantially free of oxides which tend to inhibit attachment to the contacts of the chip carriers and the pads on the circuit boards, and to eliminate contaminated solder joints.

The following are some specific examples of further practice of the invention:

EXAMPLE I

In producing solder composition or solder cream A of the above Table, a lead-tin-silver metallic mixture in the proportions of 36% lead, 62% tin and 2% silver, is formed into a very finely divided powder which is substantially free of oxides.

The metallic powder is blown into a chamber, the metal balls are screened so that the particle size thereof is between 40 and 70 microns, and the particles are then mixed with the vehicle containing cetyl alcohol, such operations being carried out in an inert atmosphere, e.g., of nitrogen, to eliminate oxidation of the metals, as described in detail above and illustrated in FIG. 4. In this example, the alcohol solventcontaining vehicle and metal mixture were combined in a percentage of 13.5% of the vehicle and 86.5% of the metallic mixture, by weight.

The solder cream was used to secure miniature electronic components to a ceramic substrate. A printed circuit was produced on the substrate. The circuit was on one side of the substrate, with pads composed of platinum and gold being provided in certain areas, other parts of the circuit being covered with an insulating material.

A screen was placed over the circuit and the pads, and the above solder cream was screened onto the pads on the circuit board. Thereafter, electronic components including capacitors and resistors were carefully positioned with their peripheral contacts on the solder cream-coated pads.

When all of the components were thus in place, the board, with such components temporarily positioned and retained thereon by the solder cream, was placed in a vapor phase system and subjected to a temperature of 215° C. Since the metal mixture or alloy employed has a melting range between 177° C. and about 189° C., the system temperature melted the metallic particles in the solder cream and also liquefied the vehicle including the cetyl alcohol solvent, and fused or adhered the contacts of the components, to the pads on the circuit board, leaving the components securely positioned in place and soldered to the pads on the board.

The soldering operation described above was carried out as a high speed operation, with substantially no evaporation of alcohol solvent.

Following the soldering operation, it was observed that all of the contacts such as contact portions 33 in FIG. 3, were securely soldered as at solder connections 41 to the pads 14, with no movement or displacement of the components, and that there were no solder balls formed on the substrate either between or about the contacts of the electronic components or beneath the components.

EXAMPLE 11

The high speed soldering procedure of Example I was followed employing respectively, solder compositions B through F of the above Table.

Substantially the same results were obtained, namely, effective soldering of the electronic components to the pads 14, with no displacement of components and without formation of solder balls on the substrate either between the contacts of the electronic components or beneath the components.

From the foregoing, it is seen that the invention provides a novel solder composition comprised of essentially conventional components including vehicle containing flux and solder metals. However, by the employment of a vehicle containing certain low volatile high molecular weight alcohols as solvent, in conjunction with the above range of proportions of vehicle and solder metal in the solder composition, it has been found that when such solder composition is employed particularly for soldering electronic components in electronic circuits using high speed soldering operations, the alcohol component does not rapidly evaporate, resulting in efficient solder connections between such components without movement of components and with practically complete elimination of solder balls causing shorts, between, around and beneath the electronic components.

While particular embodiments of the invention have been described for purposes of illustration, it will be understood that various changes and modifications within the spirit of the invention can be made, and the invention is not to be taken as limited except by the scope of the appended claims.

What is claimed is:

1. A solder composition especially adapted for high speed soldering of components in electronic circuitry, which comprises finely divided solder metal dispersed in a vehicle containing as solvent a low volatile high molecular weight alcohol, said vehicle being present in an amount of 10 to 14%, and said solder metal being present in an amount of 86 to 90%, by weight of said composition.

2. The composition of claim 1, said low volatile alcohol being a primary aliphatic monolcohol containing about 8 to about 18 carbon atoms.

3. The composition of claim 2, said alcohol being present in an amount in the range of about 10 to about 50% by weight of the vehicle.

4. The composition of claim 3, said alcohol being cetyl alcohol.

5. A solder composition especially adapted for high speed soldering of components in electronic circuitry, whereby movement of said components is avoided and essentially no solder balls are formed, said solder composition comprising finely divided solder metal dispersed in a vehicle containing (a) a viscosity-controlling agent, (b) an organic solvent in the form of a low volatile high molecular weight alcohol, and (c) a flux, the particle size of said metal ranging from about 40 to about 70 microns, said vehicle being present in an amount of 10 to 14%, and said solder metal being present in an amount of 86 to 90%, by weight of said composition.

6. The composition of claim 5, said low volatile alcohol being a high molecular weight primary aliphatic monoalcohol.

7. The composition of claim 6, said alcohol being present in an amount in the range of about 10 to about 50% by weight of the vehicle.

8. A solder composition especially adapted for high speed soldering of components in electronic circuitry, whereby movement of said components is avoided and essentially no solder balls are formed, said solder composition comprising finely divided solder metal dispersed in a vehicle containing (a) a thixotropic agent, (b) an organic solvent comprised of a primary aliphatic monoalcohol containing about 8 to about 18 carbon atoms, in an amount of about 10 to about 50% by weight of the vehicle, and (c) a flux, said vehicle being present in an amount of 10 to 14%, and said solder metal being present in an amount of 86 to 90%, by weight of said composition, the particle size of said metal ranging from about 40 to about 70 microns.

9. The composition of claim 8, said alcohol being a saturated alcohol.

10. The composition of claim 9, said alcohol employed in an amount of about 10 to about 30% by weight of the vehicle.

11. The composition of claim 8, said alcohol being cetyl alcohol.

12. The composition of claim 8, the metal particles of said solder metal being round.

13. The composition of claim 8, said flux being a rosin type flux or a paraffin wax.

14. The composition of claim 8, employing 13.5% of said liquid vehicle and 86.5% of said solder metal by weight.

15. The composition of claim 8, said solder metal being selected from the group consisting of tin, lead and silver, and alloys and mixtures thereof.

16. The composition of claim 8, said alcohol containing about 12 to about 18 carbon atoms.

17. The composition of claim 8, said thixotropic agent being hydrogenated castor oil or carboxy methyl cellulose.

18. The composition of claim 8, said rosin type flux comprising abietic acid.

19. The composition of claim 8, wherein said vehicle consists of 0.5–10% of (a); 10–50% (b) and 20–65% of (c), by weight.

20. A solder composition especially adapted for high speed soldering of components in electronic circuitry, whereby movement of said components is avoided and following soldering essentially no solder balls are formed, said solder composition comprising finely divided solder metal dispersed in a generally liquid vehicle containing (a) 0.5–10% hydrogenated castor oil, (b) 10–50% of a saturated primary aliphatic monoalcohol containing about 12 to about 18 carbon atoms, (c) 20–65% of a flux comprising abietic acid or a paraffin wax, the particle size of said metal ranging from about 40 to about 70 microns, said liquid vehicle being present in an amount of 10 to 14%, and said solder metal being present in an amount of 86 to 90%, by weight of said composition.

21. The composition of claim 20, said vehicle including 0.01–10% of isopropyl amine.

22. The composition of claim 20, said monoalcohol being cetyl alcohol employed in an amount of about 10 to about 30% by weight of said vehicle.

23. The composition of claim 22, said liquid vehicle being present in an amount of 13.5% and said solder metal being present in an amount of 86.5%, by weight of said composition.

24. The composition of claim 20, said metal being alloys or mixtures of tin, lead and silver; tin and lead; tin and silver; and lead and silver.

25. The composition of claim 20, said solder metal being an alloy of 62% tin, 2% silver and 36% lead.

26. The composition of claim 20, said solder metal being a tin-lead alloy.

* * * * *